United States Patent [19]

Bumgardner

[11] 4,027,974

[45] June 7, 1977

[54] OPTICAL FREQUENCY PROCESSOR

[76] Inventor: Jon H. Bumgardner, 738 Felspar, Ridgecrest, Calif. 93555

[22] Filed: Dec. 5, 1975

[21] Appl. No.: 638,137

[52] U.S. Cl. .................................. 356/74; 250/226; 356/88; 356/178

[51] Int. Cl.² .......................................... G01J 3/14

[58] Field of Search ............. 250/199, 226; 356/74, 356/88, 89, 93–95, 178

[56] References Cited

UNITED STATES PATENTS

| | | | |
|---|---|---|---|
| 2,620,444 | 12/1952 | Heigl et al. | 356/88 |
| 2,621,298 | 12/1952 | Wild et al. | 356/88 |
| 3,737,234 | 6/1973 | Shibata et al. | 356/88 |

*Primary Examiner*—F. L. Evans
*Attorney, Agent, or Firm*—R. S. Sciascia; Roy Miller; W. Thom Skeer

[57] ABSTRACT

A system for determining the frequency or related characteristic of radiation on a continuous real-time basis includes a prism producing a chromatic dispersion and having two exit paths. One light in one path is attenuated by a constant attenuation factor, the light is attenuated by a constant attenuation factor, the light in the other path is attenuated by a factor that is position determinative. Detectors in each path produce an anolog of the intensities thereof which is processed in accordance with a predetermined function to yield the frequency of the radiation.

7 Claims, 2 Drawing Figures

OPTICAL FREQUENCY PROCESSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the field of electro-optics, many systems employ devices for discerning the frequency of received radiant energy. For example, a source of optical radiant energy, such as a laser, may provide a narrow, monochromatic beam that can be used for communication or other data transfer. In most receiver systems compatible with such a source it is necessary, or at least desirable, to determine the frequency or related characteristics of the beam for direct readout or utilization by receiver circuitry. The present invention provides a direct and simple technique for obtaining the frequency or color characteristic of an incident beam of optical radiation.

Prior systems involve a greater quantity of components and complexity, and most often involve processing delays. The delays are intentionally designed into the system to store the pulse or portions of a continuous wave beam so that it may be retrieved at a later time and interrogated. Real-time processing is advantageous because it operates continuously to provide up-to-the-moment information.

SUMMARY OF THE INVENTION

The present invention is a real-time, instantaneous optical processor for determining the frequency or chromatic characteristic of an incident monochromatic beam of optical radiation. First, the beam is spectrally dispersed and split into first and second channels. Each channel contains an optical attenuator. The first channel attenuator provides a relative attenuation of one regardless of beam position, and the second channel provides attenuation which increases from one end of the spectrum spread to the other so that each frequency transmitted has an individual and unique attenuation. The beams are detected and compared in a processor which senses their differences and, thereby, determines the beam's frequency or related characteristic.

DESCRIPTION OF A PREFERRED EMBODIMENT

Figure 1:
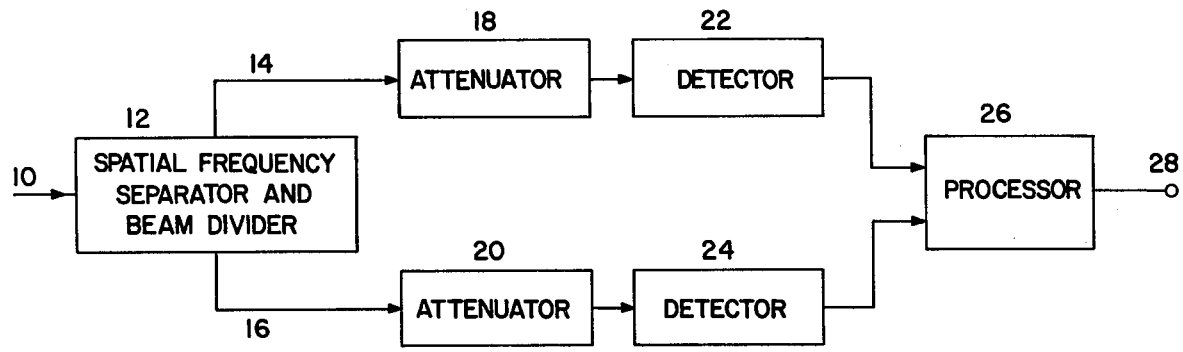
FIG. 1 is a block diagram of an embodiment of the present invention.

FIG. 1 shows a block diagram of an embodiment of the present invention wherein beam 10 is a narrow monochromatic beam of optical radiation having near parallel rays. The beam 10 impinges on spatial frequency separator and beam divider 12 is redirected according to its frequency, is chromatically dispersed, and divided into first and second channels 14 and 16, respectively. The beam in channel 14 is transmitted through attenuator 18 to detector 22, and the beam in channel 16 is transmitted through attenuator 20 to detector 24. Attenuators 18 is uniform throughout, providing the same attenuation regardless of frequency, i.e., beam redirection. Attenuators 20, as indicated by the triangular symbol, varies from one end to the other such that its attenuation factor is position related. Therefore, frequency, i.e., beam redirection, determines the degree of attenuation as the beam is transmitted by the attenuator to its detector. That is, if the beam's frequency causes it to impinge on the attenuator where the attenuator has a large attenuation factor, greater attenuation of the beam results, and if the frequency of the beam causes it to impinge on the attenuator where the attenuation factor is less, lesser beam attenuation results. The limits of the beam redirection, i.e. dispersion, for wavelengths of interest are indicated by the broken lines. The output of detectors 22 and 24 are coupled to processor 26 which provides output 28 definitive of the frequency or related characteristic of impinging beam 10.

The present invention can be used to give continuous, real-time, infinite resolution (as opposed to segmented or incremented frequency measurement) optical frequency measurement. It can determine precisely an unknown continuous wave (optical frequency), and the optical frequency of multiple pulse sources such as is required for practical laser receivers and processors.

It can also demodulate any incidental FM signal modulation on such as a laser transmitter, thus permitting novel realization of a receiver portion of an FM data link. The advantages over prior approaches include inherent simplicity with substantial reduction in cost and size, and increase in ultimate system optical sensitivity.

Mathematically, the present invention is based on the following: If attenuator 18 of channel A has a constant attenuation factor of 1.0x independent of beam frequency, and attenuator 20 of channel B has an attenuation factor from 0.5x to 1.0x dependent on beam frequency, $$f = \left[2\frac{e_b}{e_a} - 0.5\right][f_{max} - f_{min}] + f_{min}$$

where, $f$ is the unknown frequency of the beam, $f_{max}$ is the known upper designed operating frequency of the system, $f_{min}$ is the known lower designed operating frequency of the system, $e_a$ is the signal magnitude from channel A, and $e_b$ is the signal magnitude from channel B.

Note that absolute signal strength of the beam is not a factor in the relationship. Only the ratio of the outputs of the channels is significant. This is true because the outputs of the channels are compared to measure the effect the channels themselves have had on the beam, i.e., the attenuation that has been introduced, which attenuation is a function of the beam's frequency.

As shown by the mathematical relationship above, processor 26 is a divider for dividing the output of channel B by Channel A to obtain a frequency measurement. If frequency related characteristics, such as optical wavelength or optical frequency bands, are to be readout, additional processing would be added or attenuator 20 would be modified to convert the measurement into the desired characteristic.

Figure 2:
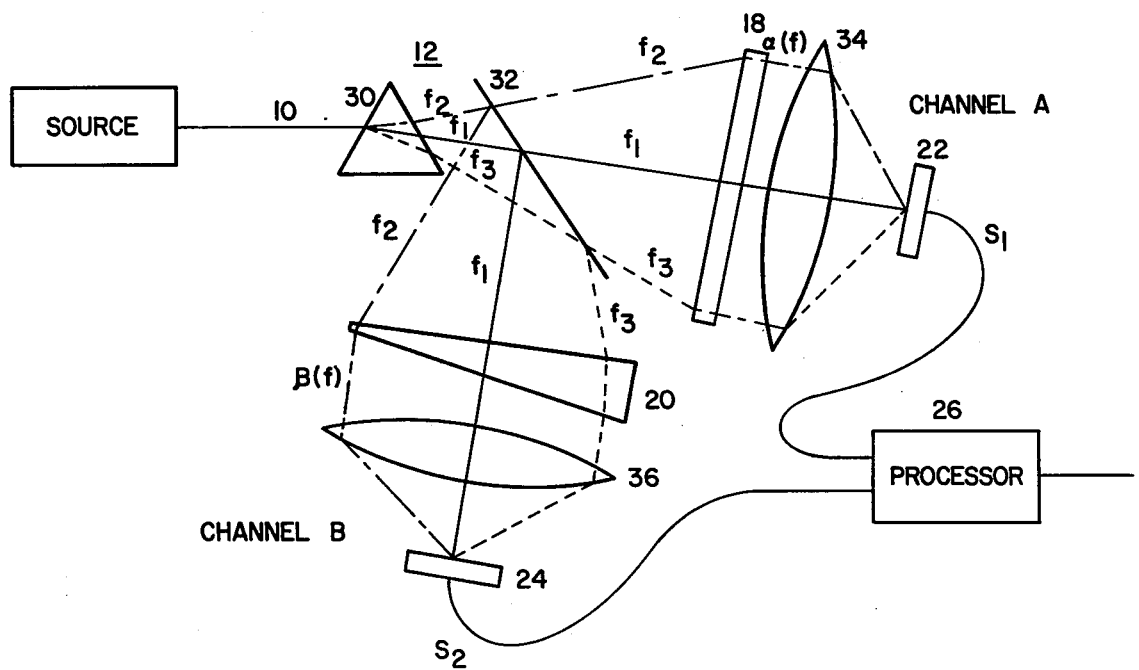
FIG. 2 is a schematic diagram of an embodiment of the present invention showing a source of monochromatic radiation.

FIG. 2 is a schematic diagram of an embodiment of the present invention. Shown are beam 10, and separator and divider 12 for spreading beam 10 according to its frequency and dividing it into first and second channels. Included therein are a means of obtaining spatial frequency separation, such as prism 30 or a diffraction grating, and a means of dividing the optical beam into two paths of equal intensity such as beam splitter 32 or a half-silvered mirror. In channel A the beam is transmitted by unity attenuator 18 which attenuates the beam by a factor of one regardless of position (i.e., regardless of frequency), to a means for collecting the radiation transmitted by the attenuator, such as convex lens 34 or a parabolic mirror if desired, and directing it onto detector 22. The output of detector 22 is coupled to processor 26 wherein it may be amplified and processed.

Similarly in channel B, the beam is transmitted by attenuator 20 and collected and directed by means 36 to detector 24. The output of detector 24 is also coupled to processor 26 for comparison with the output of channel A. The difference in the channels resides in the attenuator which attenuates the beam according to the location in which it is transmitted through attenuator 20 which, in turn, is determined by its frequency. Take, for example, the beam designated $f_1$, the frequency of which causes it to be directed through the central portion of attenuators 18 and 20 to detectors 22 and 24, respectively. Since attenuators 20 is montonically increasing throughout its length with respect to a point thereon, the relative value of the outputs is definitive of the frequency. The beam designated $f_2$ is again attenuated by unity in attenuator 18 but is attenuated to a lesser degree by attenuator 20 than $f_1$. Again, the relative value of the output is definitive of the frequency. And, the beam designated $f_3$ is likewise attenuated by unity in attenuator 18 and attenuated to a greater degree than that of $f_1$, $f_2$ by attenuator 20, and, as always, the outputs are definitive of the frequency. As is shown, the beam's frequency determines the location at which it is transmitted through attenuator 20, and thereby, determines the attenuation factor to which it is subjected. Since the attenuation factor in channel A is constant regardless of frequency, the frequency of the beam can be measured by comparing the outputs of Channel A and B. The system may be more completely understood by the following mode of operation in which monochromatic radiation impinges on the system at separator and divider 12 and is directed equally into channels A and B wherein it is separately attenuated. Attenuation in channel A is independent of frequency, but attenuation in channel B is frequency dependent. Since each frequency transmitted by separator and divider 12 has a unique path, and attenuation in channel B is path-dependent, the channel outputs can be compared to measure the frequency of the impinging radiation. Although the attenuators shown have an attenuation factor of unity, and from 0.5x to 1.0x, respectively, it is understood that other combinations may be employed and that selection may be made by the operator for his convenience, such as to detect various frequency bands in discrete jumps, etc. Also, the input to processor 20 may incorporate a high pass filter to cause the processor output to respond to optical pulses only, and thus ignore steady monochromatic or steady multichromatic light, providing the pulse optical frequency only.

To those skilled in the art it will be obvious upon a study of this disclosure that the present invention permit a variety of modifications and hence can be given embodiments other than those particularly illustrated in structure and arrangement and described herein, without departing from the essential features of the invention and within the scope of the claims annexed hereto.

What is claimed is:

1. An optical source frequency processor, comprising:
    dispersion means fixedly mounted on intercept a beam of radiant energy for providing spatial redirection according to the frequency of beam of radiant energy incident thereon so as to produce a chromatically dispersed output therefrom;
    optical means with respect to said dispersion means fixedly positioned so as to intercept the output thereof for splitting said spatially redirected radiant energy into a plurality of beams;
    first modifying means fixedly positioned with respect to said optical means for uniformly attenuating one of said plurality of beams;
    second modifying means fixedly positioned with respect to said dividing means for attenuating another of said plurality of beams an amount having a predetermined relationship with the amount of spatial redirection introduced by said dispersion means;
    detector means fixedly positioned with respect to said first and second modifying means for separately detecting each of said attenuated beams and providing separate outputs responsive to the intensity of each of said attenuated beams; and
    means for processing said outputs effectively connected to said detector means to provide an output definitive of a characteristic of said radiant energy.

2. The processor of claim 1 wherein said dispersion means is a prism.

3. The processor of claim 2 wherein said processing means is a divider for dividing the detected output responsive to one of said uniquely attenuated beams by the detected output of the other.

4. The processor of claim 2 wherein said processing means comprises frequency from $$f = \left[ 2\frac{e_b}{e_a} - 0.5 \right][f_{max} - f_{min}] + f_{min}$$

where $f$ is the frequency of said radiation from said source, $f_{max}$ is the known upper designed operating frequency of the system, $f_{min}$ is the known lower designed operating frequency of the system, $e_a$ is the signal magnitude of the detected output responsive to the beam attenuated by the filter having said invariant attenuation factor, and $e_b$ is the signal magnitude of the detected output responsive to another of said uniquely attenuated beams.

5. The processor of claim 1 in which said first modifying means is an optical attenuator with a uniform characteristic which reduces the intensity of a beam passed thereby by an amount which is independent of the interception point thereon.

6. The processor of claim 1 in which said second modifying means is an optical attenuator with a transmission characteristic which reduces the intensity of a beam passed thereby by an amount which is a function of the interception point of the beam thereon.

7. The processor of claim 6 in which said optical attenuator is a monotonic increasing uniformly throughout its extent.

* * * * *